United States Patent
Van der Steen (10) Patent No.: US 9,501,672 B2
(45) Date of Patent: Nov. 22, 2016

(54) ELECTRICAL CARD CONNECTOR PREVENTING CARD FROM FLYING OUT OF THE RECEIVING SPACE

(71) Applicant: FOXCONN INTERCONNECT TECHNOLOGY LIMITED, Grand Cayman (KY)

(72) Inventor: Hendrikus P. G. Van der Steen, Den Dungen (NL)

(73) Assignee: FOXCONN INTERCONNECT TECHNOLOGY LIMITED, Grand Cayman (KY)

(*) Notice: Subject to any disclaimer, the term of this patent is extended or adjusted under 35 U.S.C. 154(b) by 0 days.

(21) Appl. No.: 14/599,977

(22) Filed: Jan. 19, 2015

(65) Prior Publication Data

US 2015/0214661 A1    Jul. 30, 2015

(30) Foreign Application Priority Data

Jan. 24, 2014  (CN) .................. 2014 2 0044191 U (51) Int. Cl.
G06K 7/00    (2006.01)
G06K 13/08   (2006.01)

(52) U.S. Cl.
CPC ........... *G06K 7/0021* (2013.01); *G06K 13/085* (2013.01)

(58) Field of Classification Search
CPC .. H04B 1/3816; H01R 12/714; H01R 12/89; H01R 13/6335; H01R 13/629; H01R 13/633; H01R 13/64; H01R 13/6581; G06H 13/085; G06K 7/0021
USPC .............................. 439/159, 160; 361/679.32
See application file for complete search history.

(56) References Cited

U.S. PATENT DOCUMENTS

| | | | |
|---|---|---|---|
| 5,257,414 A * | 10/1993 | Trahan | G06K 7/0021 235/441 |
| 5,440,448 A | 8/1995 | Stewart et al. | |
| 6,027,350 A * | 2/2000 | Chen | H01R 13/633 439/159 |
| 6,304,454 B1 * | 10/2001 | Akamatsu | G06K 7/0021 174/382 |
| 6,663,403 B2 * | 12/2003 | Hsu | G06K 13/08 439/157 |
| 6,974,338 B1 * | 12/2005 | Hasegawa | G06K 13/08 439/159 |
| 7,427,206 B2 * | 9/2008 | Takei | G06K 13/0831 439/159 |
| 7,442,086 B1 * | 10/2008 | Chang | H01R 13/6205 439/305 |
| 7,780,464 B2 * | 8/2010 | Li | G06K 7/0021 439/327 |
| 2006/0286870 A1 * | 12/2006 | Chen | H01R 23/6873 439/637 |

FOREIGN PATENT DOCUMENTS

TW            M417694          12/2011

* cited by examiner

*Primary Examiner* — Amy Cohen Johnson
*Assistant Examiner* — Oscar C Jimenez
(74) *Attorney, Agent, or Firm* — Wei Te Chung; Ming Chieh Chang (57) ABSTRACT

An electrical card connector (100) includes an insulative housing (1), a number of contacts (2) retained in the insulative housing, a metal shell (3) covering the insulative housing for defining a receiving space (10) and having an opening (31) extending along a front-and-rear direction, and a slider (4) movable on the insulative housing along the front-and-rear direction. The slider includes a base portion (41), an operating portion (44) extending upwardly from the base portion to be exposed outside of the metal shell through the opening, and an actuating portion (45) extending sidewardly from the base portion into the receiving space for ejecting an insertion card. The operating portion is operable to move the slider.

3 Claims, 11 Drawing Sheets

ELECTRICAL CARD CONNECTOR PREVENTING CARD FROM FLYING OUT OF THE RECEIVING SPACE

BACKGROUND OF THE INVENTION

1. Field of the Invention

The present invention relates generally to an electrical card connector, and more particularly to an electrical card connector that prevents an inserted card from flying out of its receiving space during ejection.

2. Description of Related Arts

An electrical card connector usually comprises an insulative housing, a plurality of contacts retained in the insulative housing, a metal shell covering the insulative housing for defining a receiving space, and an ejector ejecting an inserted card out of the receiving space along an ejection direction. The ejector usually comprises a slider with a heart-shaped slot for effectuating a push-push operation, a spring member biasing the slider toward the ejection direction, and a pin member with one end secured on the insulative housing and the other end moveable in the heart-shaped slot. The spring member is deformed by the inserted card during the card's insertion process to impart spring force. During the card's ejection process, stored energy of the spring member is released to drive the slider to move along the ejection direction and therefore push the card out of the receiving space. Because the force of the spring member is not controlled by a user, the card may fly out of the receiving space if not properly handled.

U.S. Pat. No. 5,440,448, issued to Stewart et al. on Aug. 8, 1995, discloses a small computer having a card interface slot and an ejection mechanism for ejecting an inserted card. A user ejects the inserted card by sliding a slider which is positioned in a shallow recess on the bottom of the computer. The slider is connected to an ejector which presses against the inserted end of the card.

An electrical card connector preventing an inserted card from flying out of the receiving space is desired.

SUMMARY OF THE INVENTION

Accordingly, an object of the present invention is to provide an electrical card connector preventing an inserted card from flying out of the receiving space.

To achieve the above object, an electrical card connector includes an insulative housing, a number of contacts retained in the insulative housing, a metal shell covering the insulative housing for defining a receiving space and having an opening extending along a front-and-rear direction, and a slider movable on the insulative housing along the front-and-rear direction. The slider includes a base portion, an operating portion extending upwardly from the base portion to be exposed outside of the metal shell through the opening, and an actuating portion extending sidewardly from the base portion into the receiving space for ejecting an insertion card. The operating portion is operable to move the slider.

Other objects, advantages and novel features of the invention will become more apparent from the following detailed description when taken in conjunction with the accompanying drawings.

DETAILED DESCRIPTION OF THE PREFERRED EMBODIMENT

Reference will now be made in detail to the preferred embodiment of the present invention.

Referring to FIGS. 1-7, an electrical card connector 100 of the present invention used for receiving an electrical card 200, comprises an insulative housing 1, a plurality of contacts 2 retained in the insulative housing 1, a metal shell 3 covering the insulative housing 1 for defining a receiving space 10, and a slider 4 assembled at a side of the insulative housing 1 for ejecting the electrical card 200 out of the receiving space 10.

Figure 1:
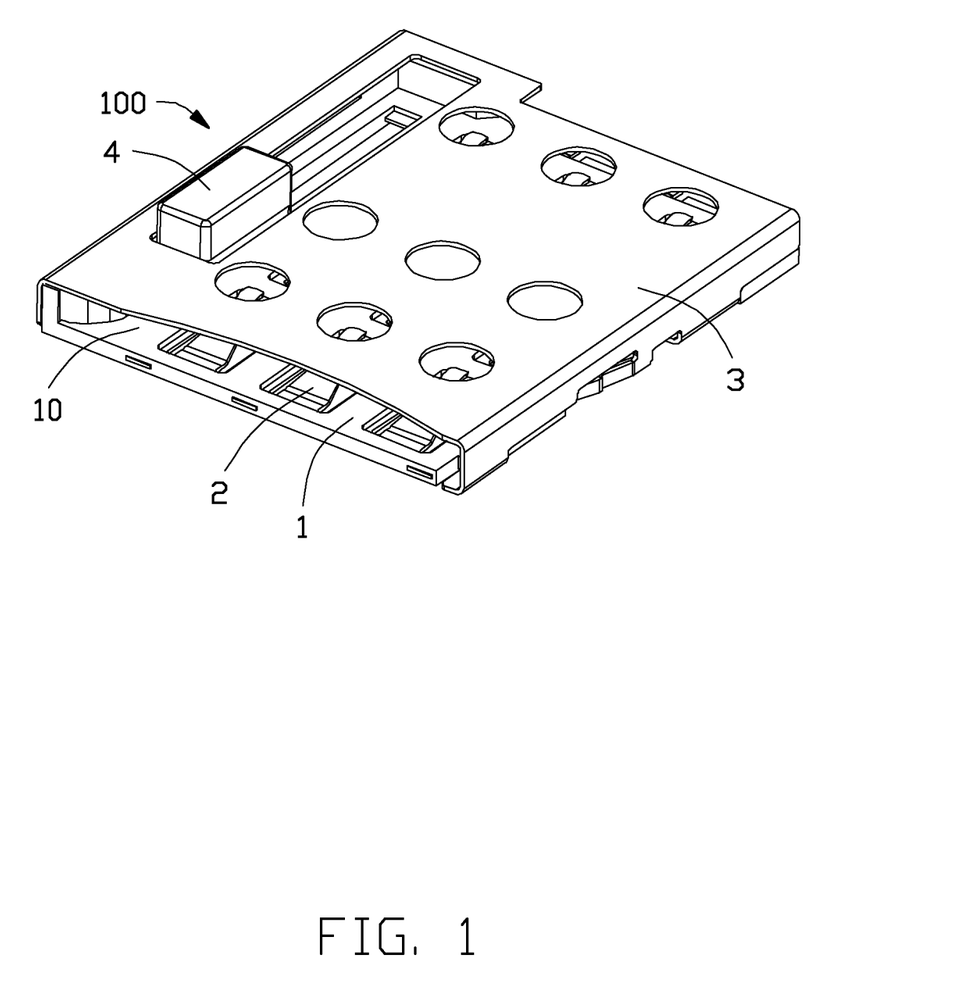
FIG. 1 is a perspective, assembled view of an electrical card connector constructed in accordance with the present invention.
Figure 2:
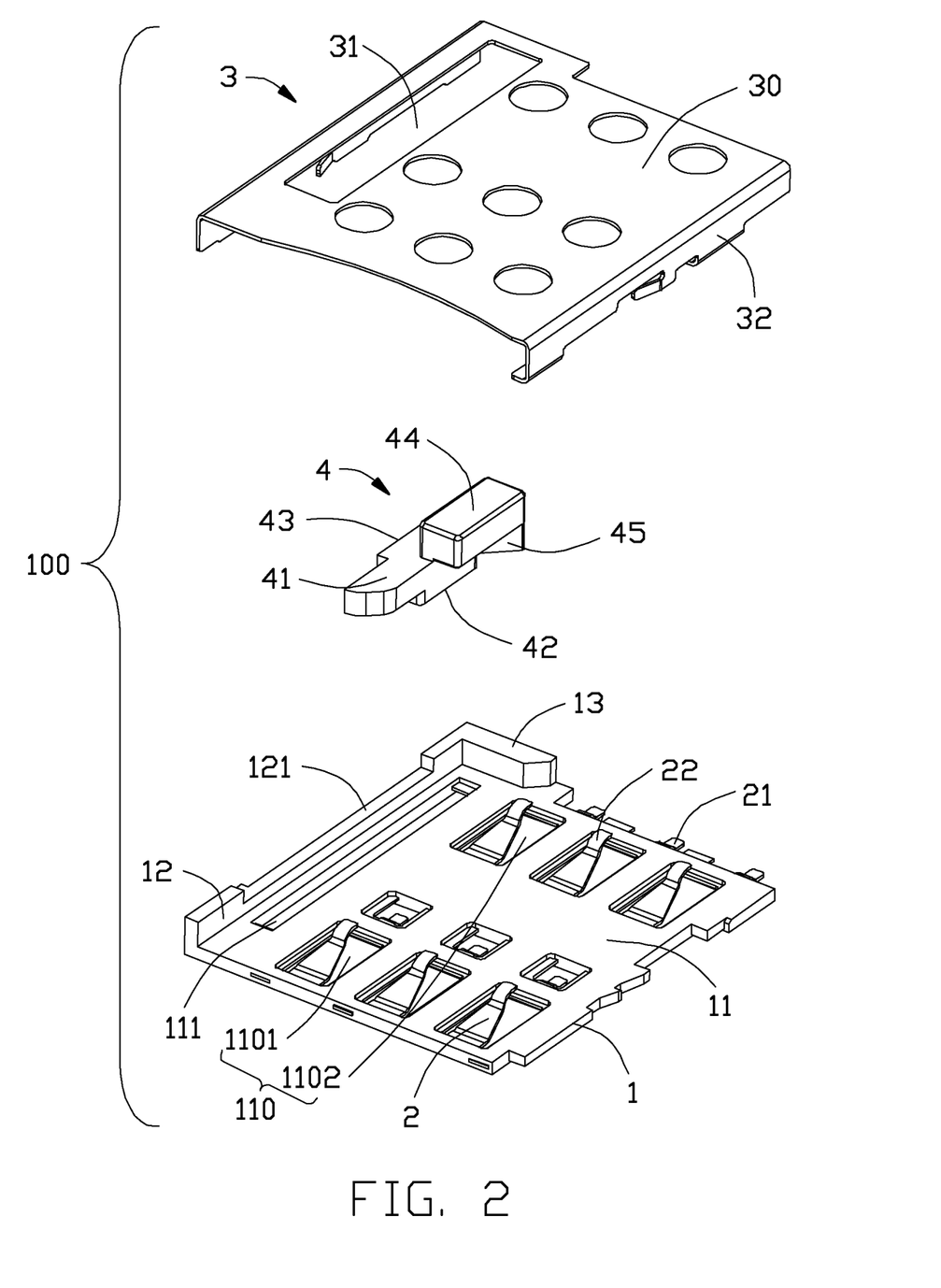
FIG. 2 is a perspective, exploded view of the electrical card connector of FIG. 1.

Referring to FIG. 2, the insulative housing 1 comprises a main portion 11 with a plurality of passageways 110 each extending along a front-and-rear direction, a left sidewall 12 extending upwardly from the left edge of the main portion 11, and a rear wall 13 extending upwardly from the rear edge of the main portion 11 and integrally connecting with the left sidewall 12. The passageways 110 are positioned in two rows each defining a left-and-right direction perpendicular to the front-and-rear direction. The main portion 11 further comprises a lengthwise slot 111 positioned between the left sidewall 12 and the passageways 110 and sidewardly extending from the front row of passageways 1101 to the rear row of the passageways 1102. The left sidewall 12 defines a lengthwise recess 121 from an upper edge thereof which is corresponding to the lengthwise slot 111 along the front-and-rear direction.

Referring to FIG. 2, the contacts 2 are retained in the passageways 110 of the insulative housing 1. Each contact 2 has a soldering portion 21 extending below a bottom surface of the main portion 11 for soldering on a printed circuit board (not shown) and a contacting portion 22 extending upwardly beyond the main portion 11 into the receiving space 10 for electrically connecting with the a plurality of electrical pads 203 of the electrical card 200.

Figure 3:
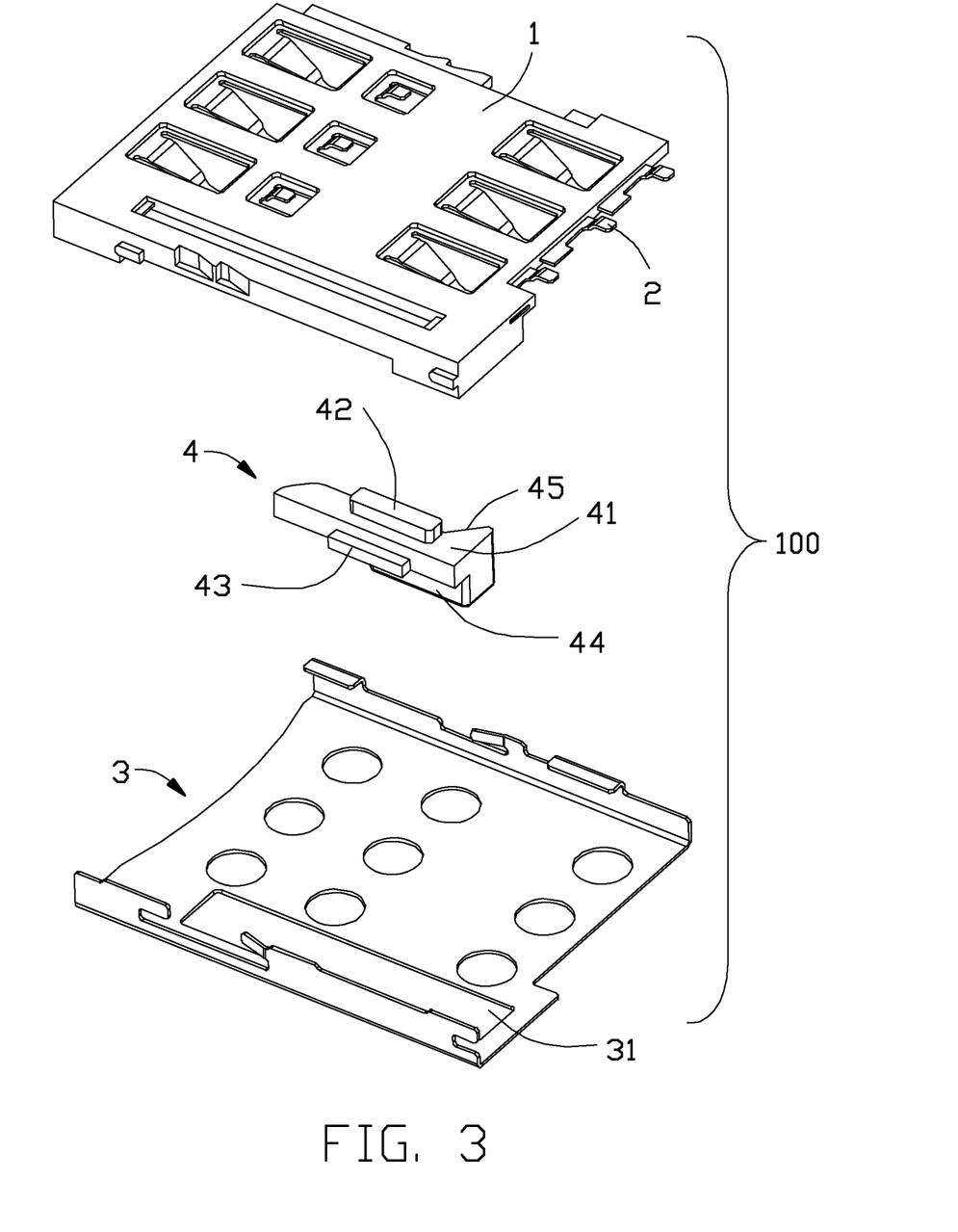
FIG. 3 is a similar to but taken a different view from FIG. 2.
Figure 4:
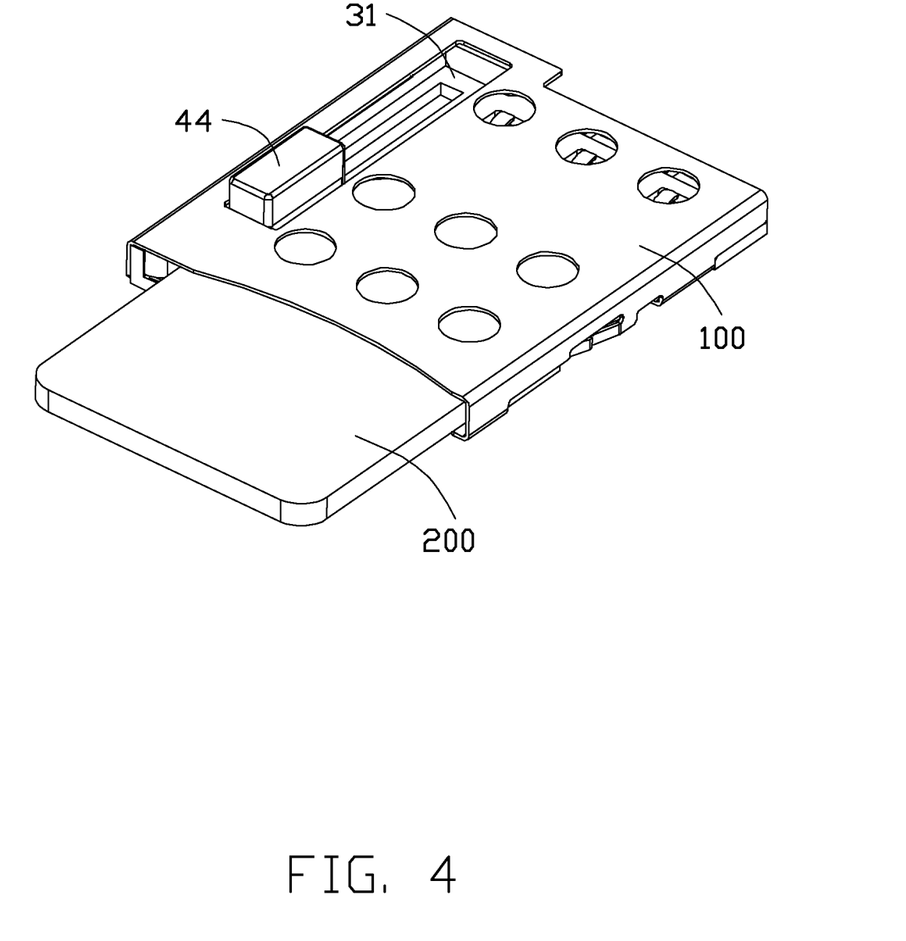
FIG. 4 is a perspective, assembled view of the electrical card connector and an electrical card is initially inserted into an receiving space of the electrical card connector, as well as a perspective view of the electrical card connector and the electrical card is about to be ejected out of the receiving space of the electrical card connector.
Figure 5:
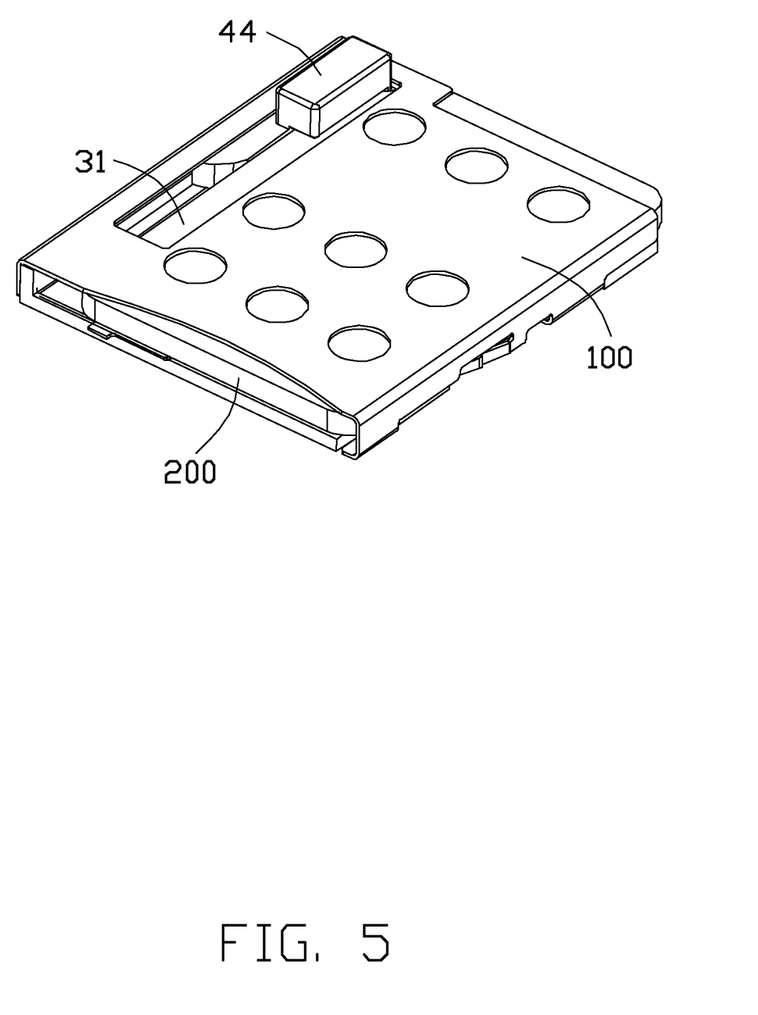
FIG. 5 is a perspective view of the electrical card connector and the electrical card is fully inserted into the receiving space of the electrical card connector.

Referring to FIGS. 2, 3, and 5, the slider 4 comprises a base portion 41, a first rib 42 extending downwardly from the base portion 41, a second rib 43 extending leftwardly from the base portion 41, an operating portion 44 extending upwardly from the base portion 41, and an actuating portion 45 extending rightwardly from the base portion 41 for protruding into the receiving space 10. When the slider 4 is assembled on the insulative housing 1, the first rib 42 is moveably received in the lengthwise slot 111 of the main portion 11 and the second rib 43 is received in the lengthwise recess 121 of the left sidewall 12. Generally speaking, the operating portion 44 and the first rib 42 are positioned at the upper-and-lower opposite sides of the base portion 41 while the second rib 43 and the actuating portion 45 are positioned at the left-and-right opposite sides of the base portion 41.

Referring to FIGS. 4-7, the metal shell 3 comprises a flat portion 30 and a pair of lateral portions 32 extending downwardly from the flat portion 30. The flat portion 30 defines an opening 31 extending along the front-and-rear direction. When the metal shell 3 is secured on the insulative housing 1, the operating portion 44 extends upwardly out of the metal shell 3 from the opening 31. The opening 31 has a certain length along the front-and-rear direction so that the operating portion 44 is moveable in the opening 31 along the front-and-rear direction.

Figure 6:
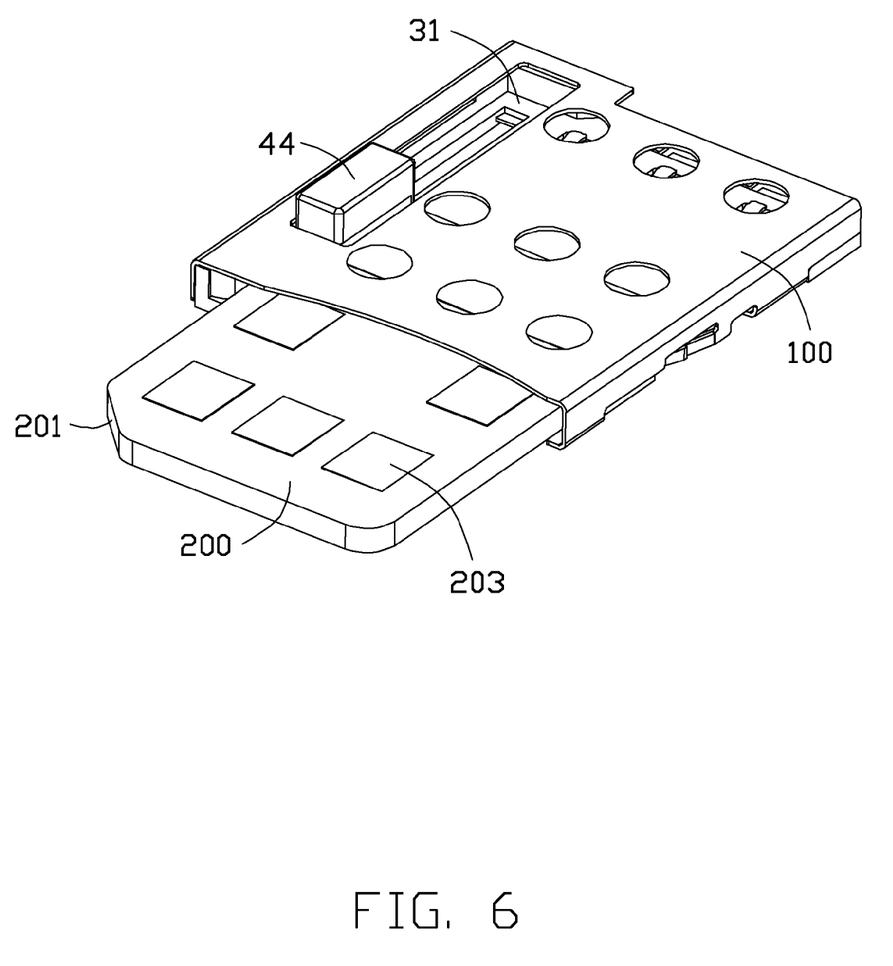
FIG. 6 and FIG. 7 are perspective views of the electrical card connectors and the electrical cards are falsely inserted into the receiving spaces of the electrical card connectors.

Referring to FIGS. 5 and 6, the electrical card 200 is substantially rectangular shaped. The electrical card 200 has a cut portion 201 at one of the corners. Therefore, the actuating portion 45 of the slider 4 engages with the cut portion 201 when the cut portion 201 is on the left and rear side for preventing false insertion of the electrical card 200 into the receiving space 10. Because when the cut portion 201 is not engaged with the actuating portion 45, the electrical connector 200 also pushes the slider 4 to move along the front-and-rear direction, but a small distance "d" of the electrical card 200 still remains being exposed outside of the receiving space 10 when the slider 4 moves to a final position where the slider 4 contact with the rear wall 13 of the insulative housing 1, notifying that the electrical card 200 is falsely inserted into the receiving space 10.

Figure 8:
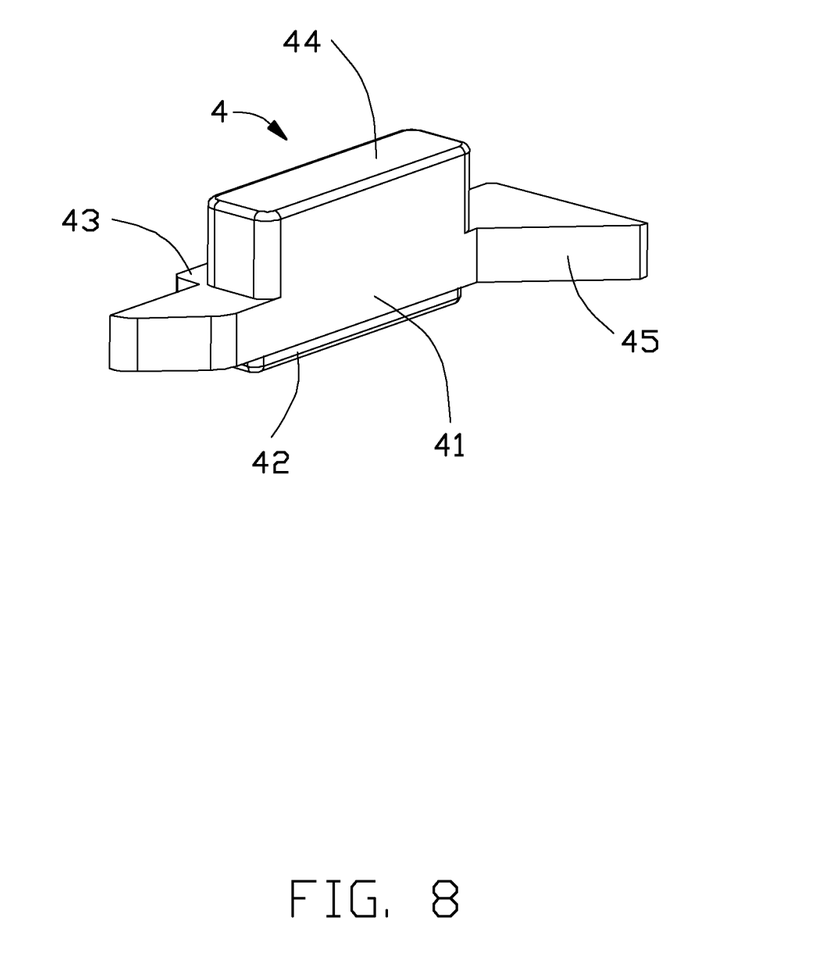
FIG. 8 is a perspective view of a slider in a second embodiment of the present invention.

The slider 4 has two embodiments respectively shown in FIG. 2 and FIG. 8. In a first embodiment in FIG. 2, the operating portion 44 of the slider 4 extends to cover the actuating portion 45. The actuating portion 45 is not visible by a user from a top, elevational view of the slider 4. In a second embodiment in FIG. 8, the actuating portion 45 is exposed beside the operating portion 44. The electrical card 200 is firmly compressed by the operating portion 44 when the slider 4 of FIG. 2 is used in the electrical card connector 100.

During insertion of the electrical card 200 into the connector 100 of the present invention, a user manually pushes on the electrical card 200 along an insertion direction to achieve an engagement between the electrical card 200 and the contacts 2 when the slider 4 is moved to the final position. During ejection of the electrical card 200, the user manually pushes on the operating portion 44 of the slider 4 along an ejection direction to eject the electrical card 200. The electrical card 200 is prevented from flying out of the receiving space 10 because speed of the slider 4 is not so fast when the slider 4 is controlled by the user.

Figure 7:
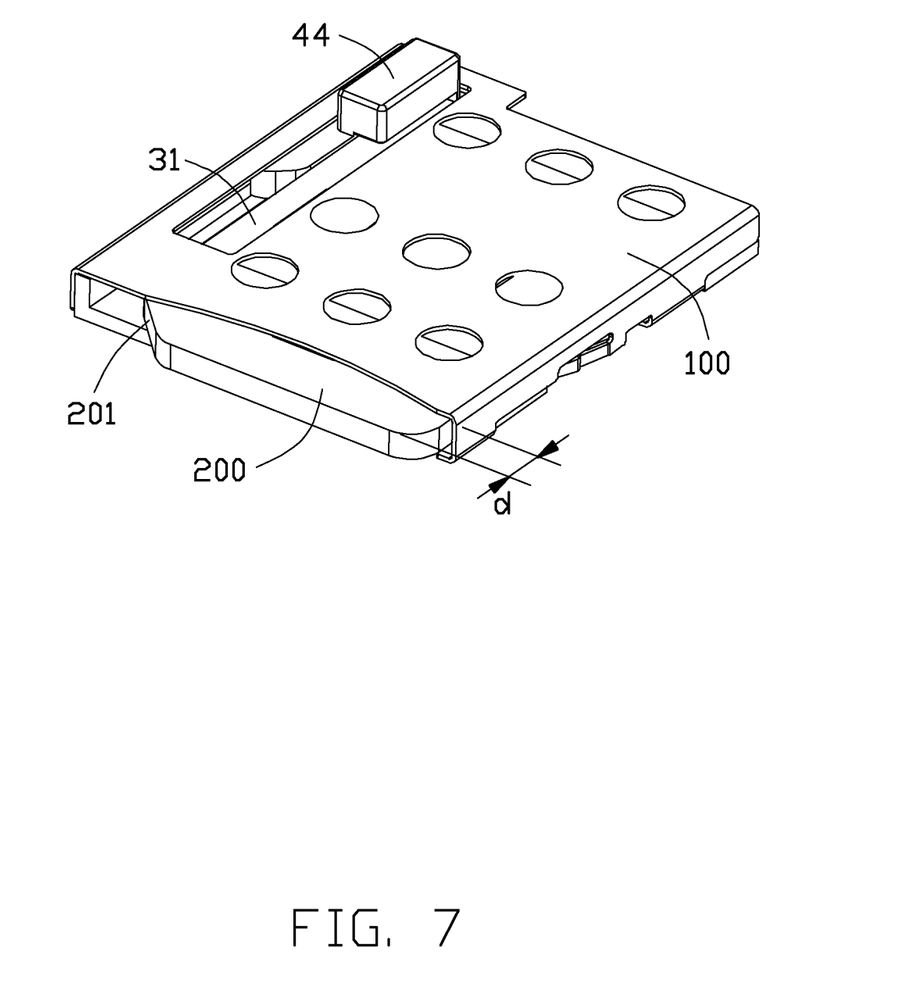
Figure 9:
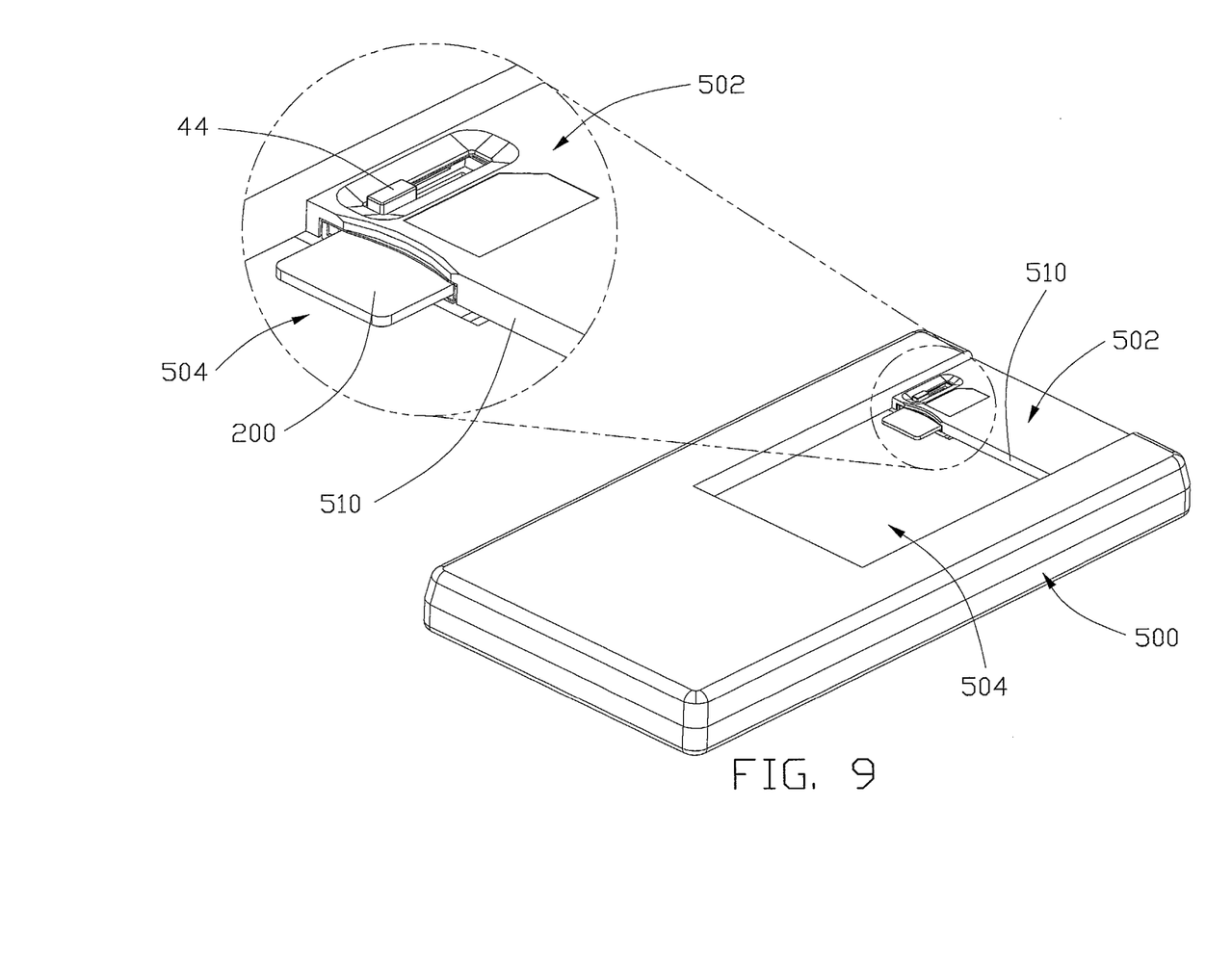
FIG. 9 is a perspective view of an electronic device on which the electrical card connector of FIG. 1 is mounted wherein the slider is moved to an outer position for ejecting the electronic card from the electrical card connector.
Figure 10:
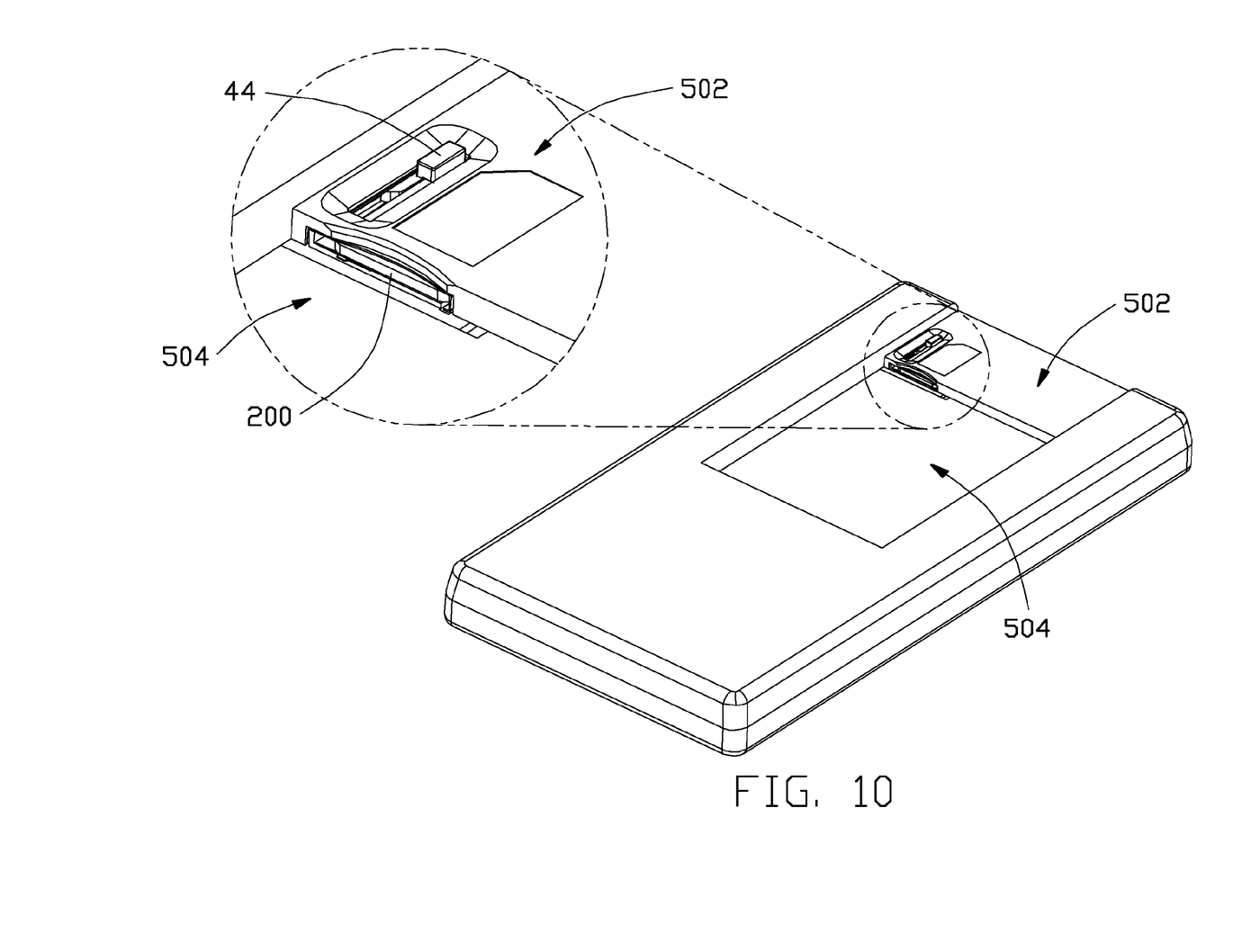
FIG. 10 is a perspective view of the electronic device of FIG. 9 wherein the slider is moved to an inner position during insertion of the card into the electrical card connector.
Figure 11:
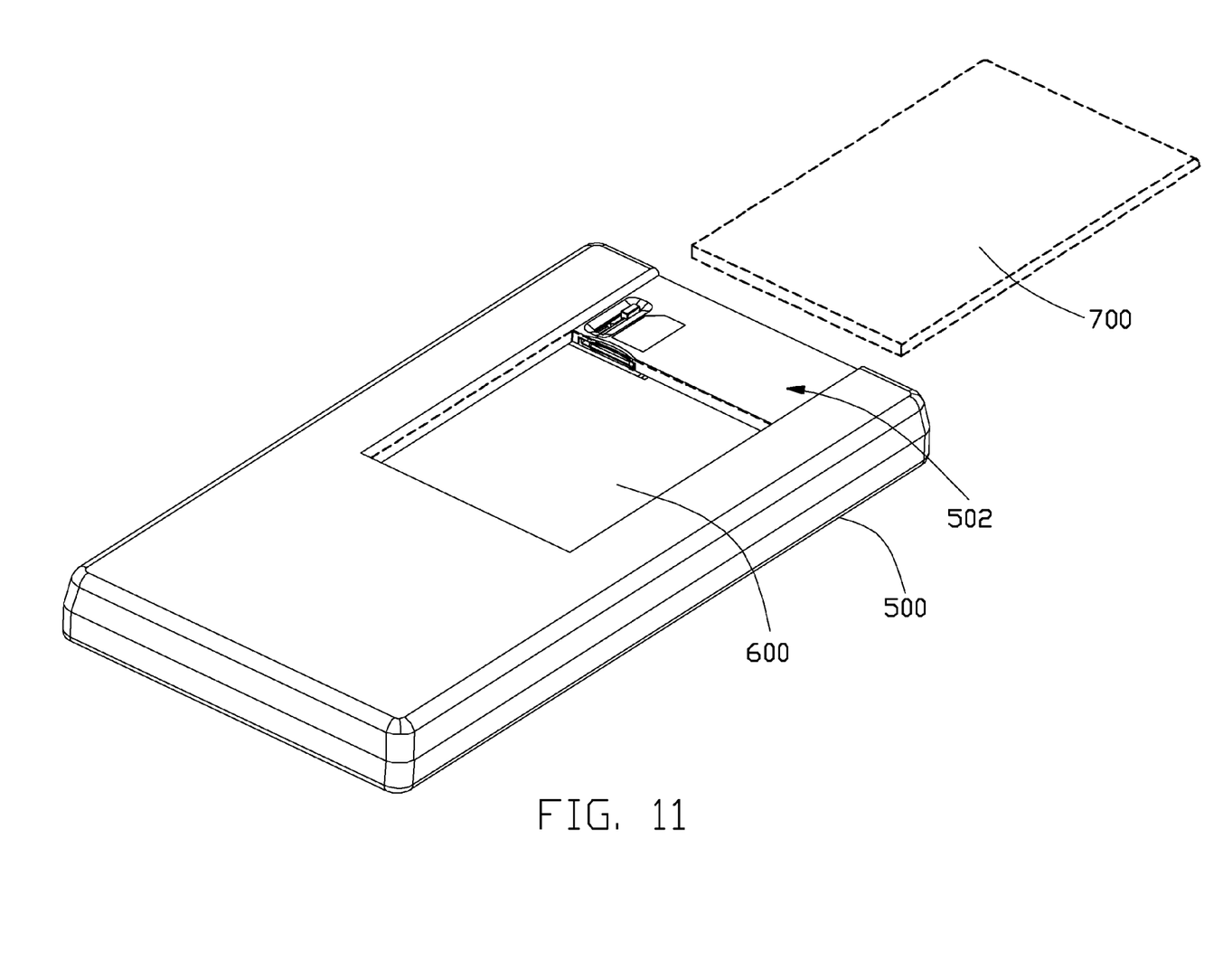
FIG. 11 is a perspective view of the electronic device of FIG. 10 with the battery installed without interference with the card.

FIG. 9 essentially shows the electrical card connector 100 used within an electronic device 500, e.g., the smart phone. The electronic device 500 forms a shallow recess 502 and deep recess 504 joined with each other with a stepped structure 510 therebetween. The receiving space 10 communicates with the deep recess 504 through the stepped structure 510 so as to allow the card 200 to be inserted into the connector 100 via said deep recess 504. The operating portion 44 of the slider 4 extends out of the shell 3 and into the thin recess. In this embodiment, both the shallow recess 502 and the deep recess 504 are located in a back face of the electronic device 500 and covered by a detachable cover 700 which complies with a contour of the case of the electronic device 500 as most mobile phone are configured. As shown in FIG. 11, the battery 600 shown in the dashed lines is adapted to be received within the deep recess 504 compliantly. Notably, when the card 200 is inserted into the receiving space 10 in a wrong way as shown in FIGS. 6 and 7, a portion of the card 200 may protrude out of the receiving space 10 and into the deep recess 504 so as to prevent the battery 600 from being installed therein. Under this condition, the whole arrangement of the electrical card connector 100 not only operates in a protective manner via the detachable cover shielding the operating portion 44 and the receiving space 10 being not exposed to the exterior outside of the case of the electronic device while only to the deep recess 504 which is shielded by the detachable cover, but also assures in a correct way via the installation of the battery 600.

While a preferred embodiment in accordance with the present invention has been shown and described, equivalent modifications and changes known to persons skilled in the art according to the spirit of the present invention are considered within the scope of the present invention as described in the appended claims.

What is claimed is:

1. An electrical card connector comprising:
    an insulative housing;
    a plurality of contacts retained in the insulative housing;
    a metal shell covering the insulative housing for defining a receiving space, the metal shell having an opening extending along a front-and-rear direction; and
    a slider movable on the insulative housing along the front-and-rear direction, the slider comprising a base portion, an operating portion extending upwardly from the base portion to be exposed outside of the metal shell through the opening, the operating portion being operable to move the slider, and an actuating portion extending sidewardly from the base portion into the receiving space for ejecting an inserted card;
    wherein the insulative housing defines two rows of front-and-rear passageways and a lengthwise slot extending from the front row passageways to the rear row passageways and wherein a first rib extending downwardly from the base portion is received in the lengthwise slot for defining a route of the slider; and
    wherein the insulative housing comprises a left sidewall, the left sidewall defines a lengthwise recess from an upper edge thereof, the slider comprises a second rib extending leftwardly from the base portion, and the second rib is received in the lengthwise recess.

2. The electrical card connector as claimed in claim 1, wherein the lengthwise recess is positioned corresponding to the lengthwise slot along the front-and-rear direction.

3. The electrical card connector as claimed in claim 1, wherein the operating portion of the slider extends to cover the actuating portion.

* * * * *